United States Patent [19]

Corbett et al.

[11] Patent Number: 4,610,402

[45] Date of Patent: Sep. 9, 1986

[54] FILAMENT WINDING FEED SYSTEM

[75] Inventors: Darrell H. Corbett, Kent; C. Robert Speelmon, Redmond, both of Wash.

[73] Assignee: The Boeing Company, Seattle, Wash.

[21] Appl. No.: 655,041

[22] Filed: Sep. 26, 1984

[51] Int. Cl.$^4$ ............... B65H 57/06; B65H 57/16; B65H 57/24; B65H 57/28

[52] U.S. Cl. ............... 242/7.22; 156/425; 242/3; 242/157 R

[58] Field of Search ............... 242/2, 3, 7.21, 7.22, 242/7.23, 157 R, 157.1; 156/425, 428

[56] References Cited

U.S. PATENT DOCUMENTS

| | | | |
|---|---|---|---|
| 2,607,540 | 8/1952 | Rekettye | 242/3 |
| 3,078,060 | 2/1963 | Le Bus, Sr. | 242/157.1 |
| 3,080,134 | 3/1963 | England et al. | 242/157 R |
| 3,130,938 | 4/1964 | Dysart | 242/157 R |
| 3,146,962 | 9/1964 | Hardwick | 242/2 |
| 3,228,616 | 1/1966 | Grosh . | |
| 3,363,849 | 1/1968 | McLarty . | |
| 3,365,346 | 1/1968 | Fritz et al. | 156/152 |
| 3,373,352 | 6/1968 | Avis et al. | 156/181 |
| 3,589,641 | 6/1971 | Lawrence | 242/157.1 |
| 3,708,132 | 1/1973 | Lang | 242/7.23 |
| 3,804,350 | 4/1974 | Williams | 242/157.1 |
| 4,158,555 | 6/1979 | Kallenborn | 65/2 |
| 4,265,692 | 5/1981 | Stone et al. | 156/180 |
| 4,267,007 | 5/1981 | Kellogg | 156/425 |
| 4,374,689 | 2/1983 | Smith et al. | 156/169 |

FOREIGN PATENT DOCUMENTS

1206133  9/1970  United Kingdom ............... 242/7.21

Primary Examiner—Billy S. Taylor
Attorney, Agent, or Firm—Christensen, O'Connor, Johnson & Kindness

[57] ABSTRACT

Disclosed is a filament winding feed system that collects and collimates strands of composite material (26) from a supply creel (22) and controls the convergence of the strands into a single band (20) at a feed eye (32) as the band is wound about a rotating mandrel (18). The feed eye (32) incorporates a ceramic ring (108) that is rotatably mounted therein. Use of the rotatable ceramic ring (108) provides a durable surface by which strands (26) can pass without causing excessive wear. The heat retention property of the ring (108) is conducive to lubrication of the passing strands without overheating the strands. The rotatable nature of the ring (108) eliminates the problem of strands bunching or twisting as they move in response to changes in the winding direction. Two comb devices are used as control elements. The first comb (24) collects the strands from the supply spools into a parallel spaced-apart relationship. A second comb (30) operates in conjunction with the feed eye to focus the strands into the band (20).

11 Claims, 8 Drawing Figures

FILAMENT WINDING FEED SYSTEM

BACKGROUND OF THE INVENTION

This invention relates to filament winding wherein a plurality of filaments or strands are wound onto a workpiece or mandrel. More particularly, this invention relates to apparatus for feeding and winding strands of preimpregnated fibrous composite material about a mandrel.

Various articles are manufactured by winding strands or filaments that are impregnated with a resin onto a rotating mandrel that corresponds to the shape of the article being fabricated. When the filament winding process is complete, the article is cured and the mandrel is removed. In the type of winding process to which this invention is primarily directed, a feed system gathers a plurality of individual strands into a side-by-side relationship to supply a band of strands that is wound about the rotating mandrel so as to form a number of superposed, helically wound layers. In addition, the invention is primarily directed to a filament winding system that employs preimpregnated fibrous strands. As is known in the art, preimpregnated strands (or "prepreg") consist of anisotropic fibers (such as graphite) that have been impregnated with a thermosetting or thermoplastic resin and heated to cause fusing of the fiber layers into a substantially unitary article.

The feed systems employed in prior art filament winding arrangements typically include a combination of guide elements such as combs and rollers that control the strands as the strands are drawn from individual supply spools, brought into spacedn-apart alignment with one another, and collimated within a feed eye to form a substantially uniform band for winding onto the rotating mandrel. There are several disadvantages and drawbacks to such prior art feed systems when preimpregnated strands are employed. Firstly, in many of the prior art systems, the strands are subjected to substantial impact and frictional contact with the various guide elements. This impact and frictional contact often causes fraying or other strand damage. Secondly, in prior art filament winding systems, the strands often tend to twist or bunch as they pass through the feed eye, rather than forming the desired substantially flat band. Both fiber damage and distortion of the filament band can substantially affect the structural integrity and strength of the article being fabricated. In addition, prior art feed eyes are generally curved or annular components that are commonly constructed of graphite, glass, nylon or steel. In many cases, friction between the feed eye and the passing band of composite material causes excessive feed eye wear and/or heats the feed eye to a temperature that melts the resin that impregnates the strands. When excessive resin melting occurs, the resin often accumulates and collects particles that are dislodged from the strands as they pass through the feed eye. This accumulated melted resin and particles often dislodge and are carried into the mandrel windings. Excessive feed eye wear results in grooves that tend to damage the passing strands and, in some instances, the strands become contaminated with particles of the feed eye material. Both of these conditions can seriously affect the quality of the article being fabricated.

SUMMARY OF THE INVENTION

This invention provides a filament winding feed system that has minimum control element contact with the strands of fibrous composite material and hence minimum damage to those passing strands. Additionally, the feed eye element of this invention, due to its material composition and design, minimizes or eliminates the heating and wearing problems associated with feed eyes of prior art systems.

In particular, this invention provides a series of control elements including: a first comb for collecting strands of composite material that are drawn from supply spools into parallel spaced-apart relationship; a roller that positions the strands in substantiallyco planar orientation as the strands pass from the first comb; a second comb that controls convergence of the strands into a single band; and a feed eye, which operates in conjunction with the second comb to focus the strands into a band as the composite material is wound onto a rotating mandrel.

In accordance with the invention, the feed eye incorporates an annular-shaped element that can freely rotate within a bracket to which it is mounted. The strands of composite material pass through the annular-shaped element in contact with its innermost surface. As the band is wound around the mandrel, directional changes of the band cause the annular-shaped element to rotate through an arc. The length of the arc is determined by the size of the directional change of the band. Since the annular-shaped element rotates in response to these directional changes, the band of composite material does not slide across the innermost surface of the element and thus the strands do not twist or bunch as they would if they slid across a fixed annular component of prior art systems.

In the currently preferred embodiment, the surface of the annular-shaped element that is in contact with the passing strands is formed of a ceramic material. This material exhibits heat conduction and durability properties such that only a limited amount of localized resin melt occurs during the winding process without excessive wear of the material.

DETAILED DESCRIPTION

Figure 1:
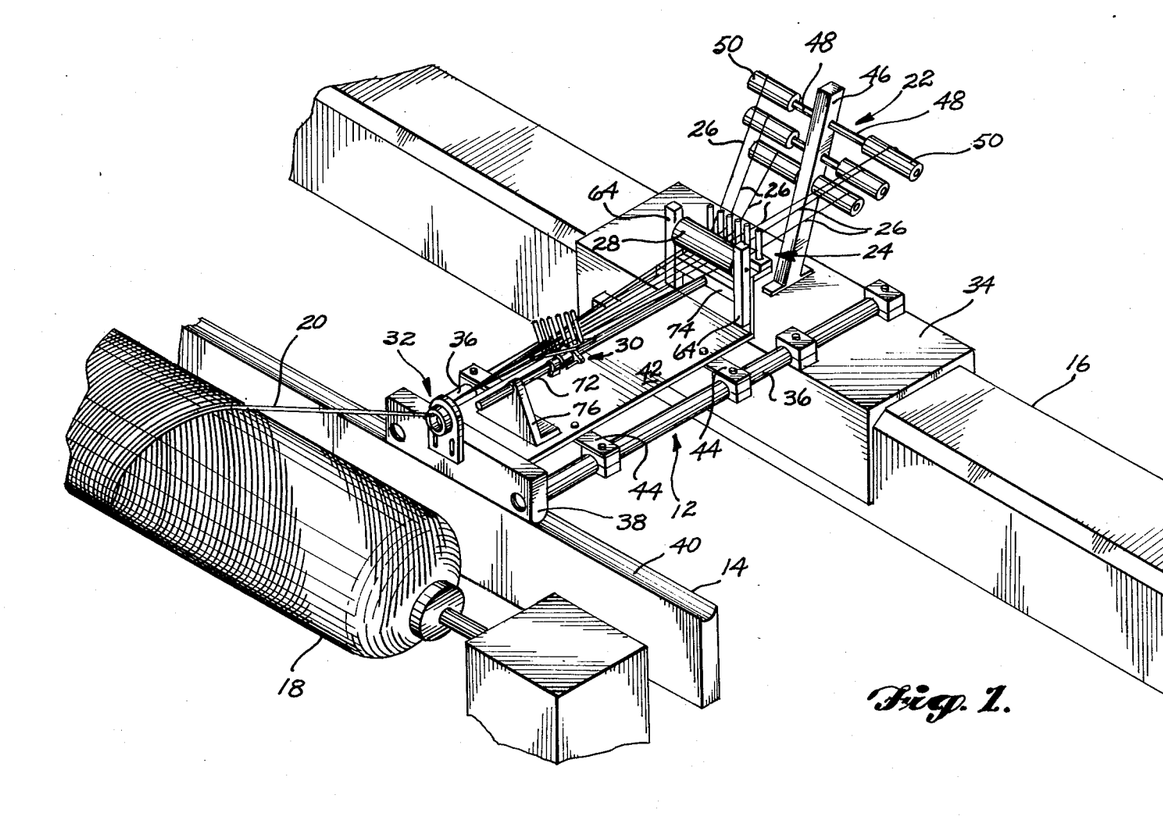
FIG. 1 is an isometric view of a filament winding feed system constructed in accordance with this invention.
Figure 2:
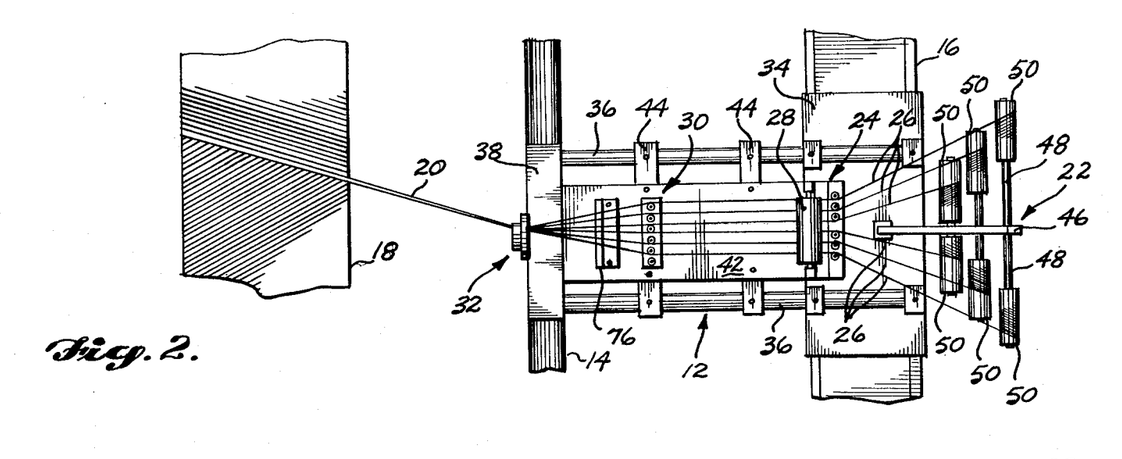
FIG. 2 is a plan view of the system of FIG. 1.
Figure 3:
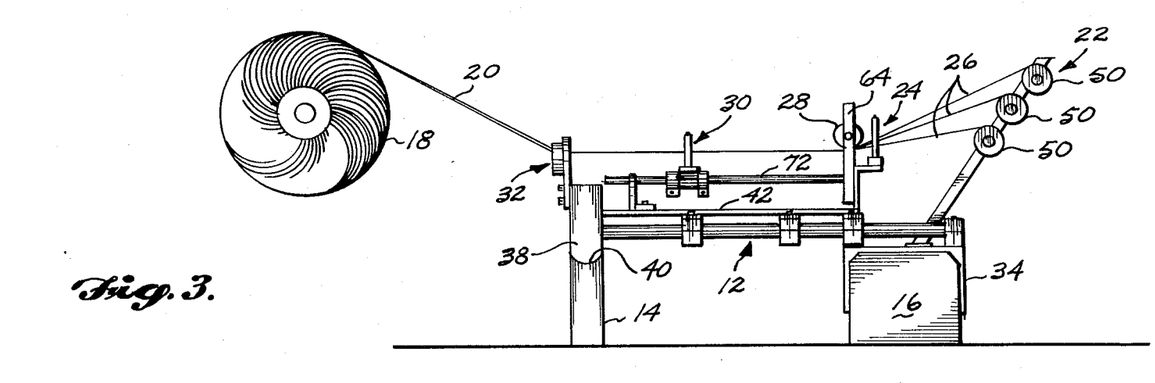
FIG. 3 is a side view of the system.

As is illustrated in FIGS. 1 through 3, the depicted embodiment of the invention generally comprises a carriage assembly 12 that is supported by forward and rear carriage supports 14 and 16, respectively. Forward and rear carriage supports 14 and 16 are beam-like members that form spaced-apart tracks that extend along one side of a cylindrical mandrel 18. As shall be recognized upon understanding the structure and operation of the invention, carriage assembly 12 travels back and forth along carriage supports 14 and 16 as mandrel 18 is rotated in a conventional manner to wind a band of composite material 20 onto mandrel 18.

Carriage assembly 12 basically consists of: a creel assembly 22, from which composite strands 26 are drawn; a first comb 24, which collects strands 26 passing from creel assembly 22 into a plurality of parallel spaced-apart strands; a roller 28, which maintains the parallel strands in substantially coplanar orientation as they pass from first comb 24; a second comb 30, which controls convergence of the strands 26 into a single band 20; and a feed eye 32, which operates in conjunction with second comb 30 to focus strands 26 into band 20 as the composite material is wound onto the rotating mandrel 18.

To provide support for the creel assembly 22, first comb 24, roller 28, second comb 30 and feed eye 32, carriage assembly 12 includes an inverted U-shaped rear slide 34 that partially encompasses and slidably engages rear carriage support 16. Two spaced-apart rods 36 are attached to the upper surface of rear slide 34 and extend horizontally into a forward slide 38. As is best illustrated by FIGS. 1 and 3, forward slide 38 is substantially rectangular in shape, with the lower edge thereof being arcuately shaped for sliding movement along an inwardly extending arcuate groove 40 in the upper surface of forward carriage support 14. A horizontal base plate 42, which provides support for the hereinafter described mounts for first comb 24, roller 28, and second comb 30, is mounted on a pair of cross supports 44 that extend between the spaced-apart rods 36.

With continued reference to FIGS. 1-3, creel assembly 22 includes an arm 46 which is mounted to and extends upwardly from the upper surface of rear slide 34. Spool rods 48 extend horizontally from arm 46 in spaced-apart, parallel orientation with rear carriage support 16. Spools 50, which are wound with a supply of the strands 26, are rotatably received on spool rods 48. Preferably, creel 22 includes a conventional tension adjustment mechanism (not shown in the FIGURES), which controls the tension exerted on strands 26 as the strands are drawn from the spools 50.

Figure 4:
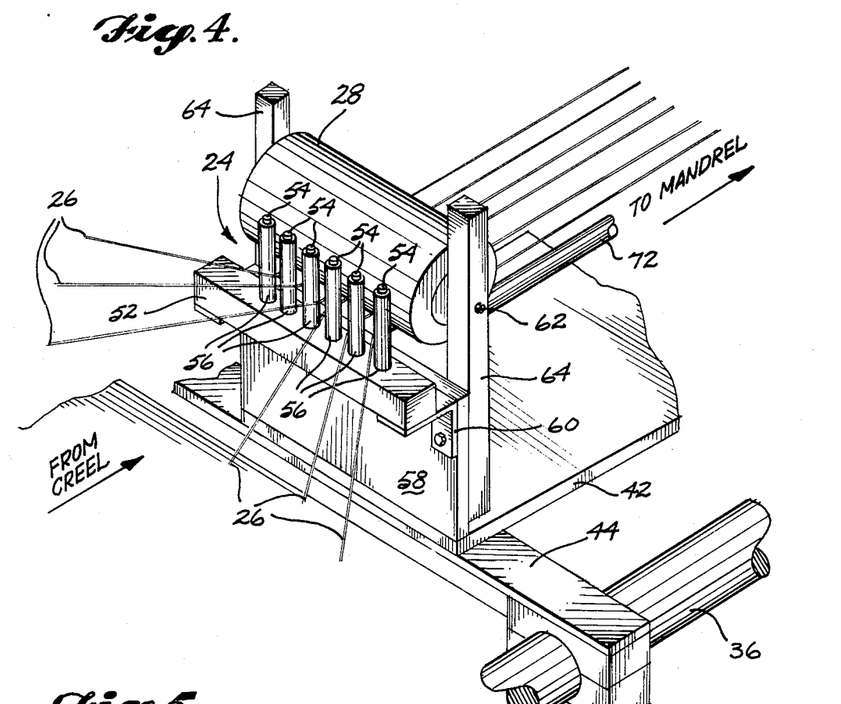
FIG. 4 is an isometric view of the first comb and roller.

As previously mentioned, first comb 24 receives strands 26 as they are drawn from spools 50 by the rotating mandrel 18. As is best shown in FIG. 4, first comb 24 includes a rectangular bar 52 that extends horizontally in spaced-apart, parallel relationship with base plate 42. A set of spaced-apart pintles 54 extend upwardly from bar 52, with each pintle being encompassed by a rotatable sleeve 56. The rotatable sleeves 56 provide guide surfaces for the strands 26, with the pintles 54 and sleeves 56 collectively functioning to collimate the strands 26 as they are drawn from the horizontally and vertically spaced-apart spools 50 of creel assembly 22. Rotation of sleeves 56 about pintles 54 minimizes damage to strands 26 that could occur if the strands were drawn across the surface of conventional fixed-type combs. Additionally, to ensure that little or no damage occurs, the rotatable sleeves 56 of the currently preferred embodiments of the invention are constructed of a material that exhibits a low coefficient of friction. One material that has been satisfactorily utilized in the practice of the invention is a tetrafluoroethylene polymer of the type commercially marketed by E. I. DuPont de Nemours and Co. of Wilmington, Del., under the trademark TEFLON.

To position first comb 24 for collection of the strands 26, the depicted embodiment of the invention includes a rectangular plate 58 that is mounted to extend upwardly from the rear edge of base plate 42. L-shaped brackets 60, mounted along the upper edge of plate 58 support the horizontally extending bar 52 of first comb 24.

With continued reference to FIG. 4, roller 28 extends horizontally across the path of strands 26 at a position forward of first comb 24 (relative to the direction in which the strands move). Relative to the vertical direction, roller 28 is positioned to bear downwardly on the strands 26 and urge the strands into a coplanar relationship in contact with the lower regions of the rotatable sleeves 56. Preferably, the outer surface of roller 28 is coated with or sleeved by a material such as the previously mentioned tetrafluoroethylene polymer that exhibits a low coefficient of friction. In the depicted embodiment, roller 28 rotates about a horizontally extending axle 62. Spaced-apart rectangular bars 64, mounted to extend upwardly along the oppositely disposed edges of rectangular plates 58 retain axle 62 and position roller 28 in the abovedescribed manner.

After passing through first comb 24 and roller 28, strands 26 are mantained parallel to one another over a distance determined by second comb 30, which is positionable to control the distance between first and second combs 24 and 30 (and hence, the distance between second comb 30 and feed eye 32). In this regard, and with particular reference to FIGS. 1, 5 and 6, second comb 30 includes a rectangular bar 66 and a set of spaced-apart pintles 68 that extend upwardly from the upper surface of rectangular bar 66. Each pintle 68 is coaxially surrounded by a rotatable sleeve 70 that is preferably constructed of the previously mentioned tetrafluoroethylene material. As can be seen in the figures, the arrangement of bar 66, pintles 68 and rotatable sleeves 70 of second comb 30 is substantially indentical to the arrangement of bar 52, pintles 54 and rotatable sleeves 56 of first comb 24.

Second comb 30 differs from first comb 24 in that second comb 30 is adapted for sliding movement along and for limited rotation about a rod 72 that is mounted substantially parallel to the strands 26 and is spaced-apart from the upper surface of base plate 42. As is best illustrated by FIG. 1 in the depicted embodiment, one end of rod 72 passes into the central portion of a rectangular support 74 that extends between the spaced-apart rectangular bars 64 that support roller 28. In this embodiment, the second end of rod 72 is retained by an L-shaped bracket 76 that extends upwardly from the forward portion of base plate 42.

Figure 5:
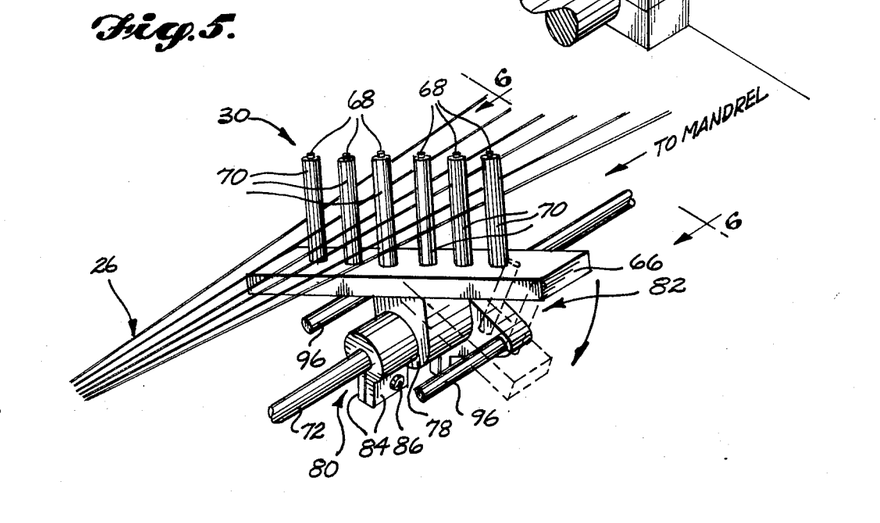
FIG. 5 is an isometric view of the second comb.
Figure 6:
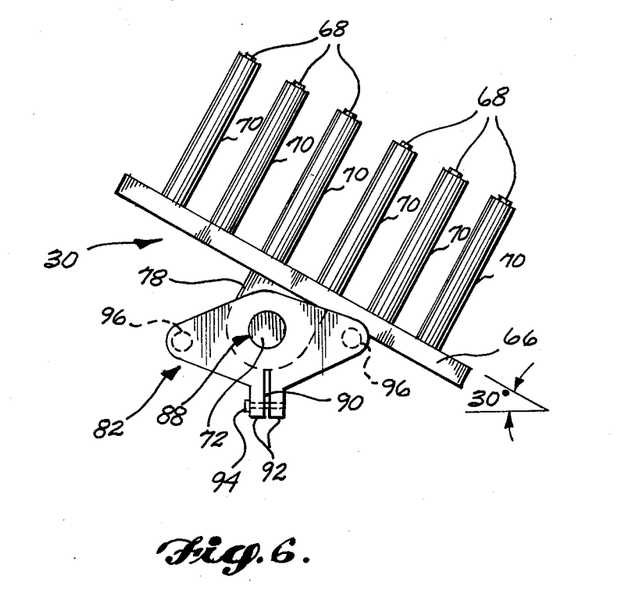
FIG. 6 is an end view of the second comb.

To permit both positioning of second comb 30 relative to first comb 24 and rotation of second comb 30 about rod 72, second comb 30 includes a sleeve 78 (FIG. 5) that extends downwardly from the lower surface of plate 66 and encompasses rod 72. With reference to FIGS. 5 and 6, second comb 30 can be retained at a selected position along rod 72 by means of a collar 80 that coaxially surrounds rod 72 at a position forward of sleeve 78 (relative to the direction of strand travel) and a retainer 82 that is located aft of collar 70 (i.e., at the face of sleeve 78 that faces first comb 24). In the embodiment depicted in FIGS. 5 and 6, collar 80 is a conventional clamping device of the type which circumferentially encompasses rod 72 with the ends of the collar forming flanged regions 84 that extend radially outward. A threaded fastener 86, which passes through the flanged regions 84, urges the flanges toward one another to decrease the diameter of collar 80 and securely tighten the collar to rod 72.

In the depicted embodiment, retainer 82 is a substantially diamondshaped plate which includes a key-shaped central opening that is adapted for clamping retainer 82 at a desired position along rod 72. More specifically, the opening includes a substantially circular region 88 that encompasses rod 72 and a slot or gap 90 that extends radially outward through flange-like extensions 92 formed in one apex of retainer 82. A bolt or other conventional fastener 94, which extends orthogonally through the flange-like extensions 92 of retainer 82 urges the extensions inwardly to clamp retainer 82 at a desired position along rod 72. To permit second comb 30 to rotate through a predetermined arc, retainer 82 includes two outwardly projecting pins 96 that extend beneath the lower surface of bar 66 of second comb 30. In the currently preferred embodiment of the invention, the distance between pins 96 and the distance between each pin 96 and the center of the opening in retainer 82 is established to permit either end of second comb 30 to rotate downwardly about rod 72 approximately 30 degrees (relative to the horizontal) before coming into abutment with one of the pins 96. The significance of the limited rotation of second comb 30 will be described in detail later.

Figures 7, 8:
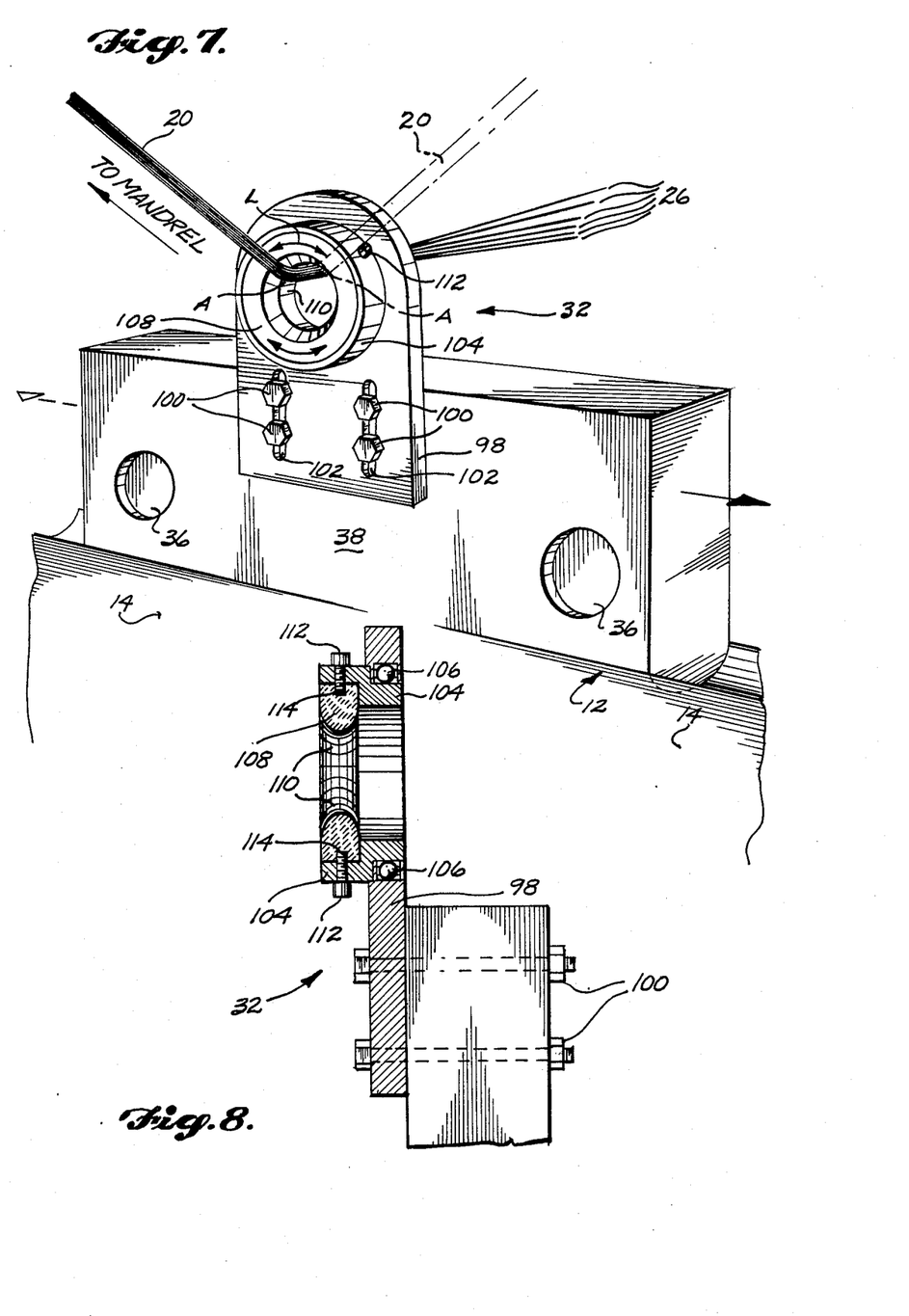
FIG. 7 is an isometric view of the feed eye.
FIG. 8 is a cross-sectional view of the feed eye.

As previously mentioned, second comb 30 operates in conjunction with feed eye 32 so that the parallel, spaced-apart strands that pass from second comb 30 converge into a substantially unitary band 20. With particular reference to FIGS. 7 and 8, feed eye 32 of the currently preferred embodiment of the invention includes an upwardly extending mounting plate 98. As is shown in FIG. 7, mounting plate 98 is fastened to forward slide 38 by means of bolts 100 which pass through a pair of parallel spaced-apart vertical slots 102 that are formed in the lower region of mounting plate 98.

As is also illustrated in FIGS. 7 and 8; convergence of the strands 26 into band 20 occurs as the strands 26 pass through a rotatable hub assembly 104 that is mounted in the upper region of vertically extending mounting plate 98. More specifically, hub assembly 104 is of substantially cylindrical geometry and is machined or otherwise formed so that hub assembly 104 exhibits a reduced outer diameter over a portion of its length (approximately one half the length of the depicted hub assembly 104). This reduced diameter region is pressed into (or otherwise retained within) the inner race of a conventional ball bearing 106 which is retained in a circular opening that is located in the upper region of mounting plate 98. The portion of hub assembly 104 that does not pass into mounting plate 98 extends outwardly toward mandrel 18 (i.e., extends in the direction of strand travel) and includes a region of increased inner diameter that forms a shoulder for retaining a ceramic ring 108.

As is shown in FIG. 8, the innermost portion of ceramic ring 108 is semi-circular in cross section to form a smoothly rounded contact surface 110 for passage of the converging strands 26.

In the arrangement depicted in FIGS. 7 and 8, radially extending set screws 112 pass through the outwardly extending portion of hub assembly 104 and into a groove 114 that extends circumferentially around the outer edge of ceramic ring 108. The set screws 112 lock ceramic ring 108 into hub assembly 104.

Various features and advantages of the invention can be appreciated by considering the manner in which the above-described system is operated to wind preimpregnated strands of composite material (strands 26 in the FIGURES) onto mandrel 18 during the fabrication of a tubular structure. Referring first to the initial system set-up procedure, the individual strands 26 are routed from the supply spools 50 through first comb 24, beneath roller 28, through second comb 30 and past contact surface 110 of the interior opening of ceramic ring 108 of feed eye 32 to form band 20, with the end of the band 20 being attached to a common point on mandrel 18 at which the filament winding is to begin. The filaments are then placed under tension with carriage 12 being positioned along mandrel 18 so as to establish the desired winding angle. During this set-up procedure, second comb 30 is moved along rod 72 so that the strands 26 will converge in the ceramic ring 108 of feed eye 32 in side-by-side contact into the single band 20 of substantially uniform width. When second comb 30 is properly positioned, collar 80 and retainer 82 are moved into abutment with sleeve 78 of second comb 30 and securely clamped to rod 72 to prevent second comb 30 from moving toward or away from mandrel 18 during the winding operation.

When the set-up procedure is complete, the system is configured as shown in FIG. 1 with each individual strand 26 contacting an associated rotatable sleeve 56 of first comb 24, the bottom of roller 28, and associated rotatable sleeve 70 of second comb 30 and contact surface 110 of ceramic ring 108. Thus, in accordance with the invention, strands 26 contact the feed system at only four points to eliminate insofar as possible the opportunity for the occurrence of damage to strands 26. Further, as previously mentioned, roller 28 and sleeves 56 and 70 are free to rotate as the strands 26 are drawn from the spools 50, thereby greatly reducing strand abrasion that could occur if the strands were forced to slide across fixed guide elements. Even further, as previously described, the surface of roller 28 and rotatable sleeves 56 and 70 of the currently preferred embodiment of the invention are formed of a material having a low coefficient of friction. Thus, any sliding action that does occur, does not result in significant damage to strands 26.

With the system initially arranged in the manner depicted in FIG. 1, and described above, the drive mechanism (not shown in the FIGURE) for mandrel 18 and carriage 12 is activated. As is known in the art, such a drive system rotates mandrel 18 while simultaneously moving carriage 12 along the mandrel at a speed that maintains the desired wrap angle (i.e., causes band 20 to be wound onto mandrel 18 as a series of side-by-side windings. For example, in the helical winding operation depicted in FIG. 1, mandrel 18 is rotating in the counterclockwise direction and carriage 12 is traveling to the right at a speed which results in the desired helical winding angle and spacing of adjacent windings.

When the carriage 12 is traveling in one direction, i.e., to the right in FIG. 1, the strands 26 focus into a band 20 in the trailing side of the ceramic ring 108 of the feed eye 32. This relationship is shown in greater detail in FIG. 7. Furthermore, since the feed eye 32 is positioned slightly below the mandrel 18, the band 20 exits through the upper portion of the trailing side of the ceramic ring 108.

The sideward pull of the band 20 is communicated through the strands 26 and causes the second comb 30 to partially rotate about rod 72 toward the side of ceramic ring 108 through which band 20 exits. This partial rotation or tipping of second comb 30 aids in guiding the strands 26 into proper convergence to form band 50 at a point in ceramic ring 108 that is slightly offset from the vertical center line of the feed eye 32 (i.e., point A in FIG. 7).

When carriage 12 reverses direction, band 20 moves to the opposite side of the feed eye 32. More specifically, when the carriage 12 of FIG. 7 reverses direction (i.e., begins to move in a direction indicated by the phantom arrow), the resulting change of direction in the tension asserted on band 20 exerts a tangential force on the hub 104 causing hub 104 to rotate until the band is repositioned with respect to the center of the hub. Once repositioned (as shown in phantom lines in FIG. 7) band 20 exerts solely radial, nonrotational, forces on the hub. This rotation of hub 104 causes band 20 to move through an arc L, with little or no sliding between the band and ceramic ring 108.

The contact surface 110 of ceramic ring 108 is subject to buildup of heat caused by the friction of the passing strands 26. As previously mentioned, certain prior art feed eyes having contact surfaces such as glass or hardened steel tend to overheat, causing substantial melting of the resin that impregnates the strands 26. Too much resin melt will create a sticky surface at the feed eye that collects loose fiber particles in the passing strands. Accumulations of the resin and fiber particles often dislodge and are carried to the mandrel with deleterious structural effects on the final product. In the currently preferred embodiment, the ceramic ring 108 is formed of silicon nitride. It has been found that silicon nitride provides a contact surface which, at typical winding speeds, tends to heat up to a point such that only a limited amount of localized resin melting occurs. This limited, localized melting has been found to be advantageous in that it provides lubrication that enhances the smooth sliding of the strands over the surface of ceramic ring 108. Yet, it has been found that ceramic rings 108 that are constructed of silicon nitride do not cause substantial resin melt nor detectable contamination of the final product at normal winding speeds.

A further advantage of the silicon nitride contact surface is its durability. Unlike prior art feed eye materials such as graphite or nylon, which are relatively soft and susceptible to grooving, silicon nitride maintains a smooth contact surface through numerous winding operations.

The above-described filament winding feed system provides a structure whereby relatively fragile, dry, impregnated fibrous composite material can be removed from its supply spool, collimated with other strands, focused into a band and uniformly applied to a mandrel or workpiece. It can be appreciated that strands of composite material having different dimensions can be accommodated by the filament winding feed system by making minor design changes, such as increasing the diameter of the feed eye or increasing the number of pintles to match the number of supply spools used. It is thus understood that various changes in the details, materials and configuration of the filament winding feed system, which has been herein described and illustrated may be made by those skilled in the art without departing from the spirit and scope of the invention as defined in the appended claims.

The embodiments of the invention in which an exclusive property or privilege is claimed are defined as follows:

1. A filament winding feed system for controlling the movement of strands of preimpregnated fibrous composite material from a supply source to a mandrel, the system comprising:
   (a) strand collimation means for collimating a plurality of strands of fibrous material drawn from the supply source; and
   (b) strand convergence means for focusing the strands into a single band for winding about the mandrel, the strand convergence means including a feed eye through which the strands are drawn, the feed eye including a mounting member and a hub assembly that is rotatably mounted to the mounting member, the feed eye also including a curved rotatable contact part configured to fit within the hub assembly and mounted to be freely rotatable therein, the feed eye also including fastener means extending through the hub assembly and configured to engage the contact part and securely retain the contact part within the hub assembly, the contact part having a contact surface that is configured and arranged for contacting the strands, the contact part being rotatable in response to forces applied to it by the band as the band changes its position relative to the mandrel during the winding process.

2. The system of claim 1, wherein the strand covergence means further includes convergence control means mounted between the strand collimation means and the feed eye for controlling the convergence of the collimated strands that pass from the strand collimation means as the strands are drawn through the feed eye, the convergence control means causing the strands to meet in side-by-side juxtaposition at the feed eye.

3. The system of claim 2, wherein the strand collimation means comprises:
   (a) comb means for aligning the strands into parallel relationship; and,
   (b) roller means for positioning the strands into a single plane.

4. The system of claim 3, wherein the contact part is formed of ceramic material.

5. The system of claim 4, wherein the contact part is formed of silicon nitride.

6. The system of claim 2, wherein the strand convergence means further includes mounting means for selectively positioning the convergence control means at various distances from the feed eye.

7. The system of claim 6, wherein the convergence control means includes a plurality of spaced-apart pintles.

8. The system of claim 7, wherein the pintles are coaxially surrounded by rotatable sleeves.

9. The system of claim 7, further comprising a rod member mounted to extend between the feed eye and the strand collimation means, the convergence control means being mounted to the rod member for rotation about an axis substantially parallel to the strands, the rotation occurring in response to forces communicated to the pintles through the strands as the band changes position relative to the mandrel during the winding process.

10. The system of claim 1, wherein the contact part is formed of ceramic material.

11. The system of claim 10 wherein the contact part is formed of silicon nitride.

* * * * *

UNITED STATES PATENT AND TRADEMARK OFFICE
CERTIFICATE OF CORRECTION

PATENT NO.   :   4,610,402

DATED        :   September 9, 1986

INVENTOR(S)  :   Darrell H. Corbett

It is certified that error appears in the above-identified patent and that said Letters Patent is hereby corrected as shown below:

| | |
|---|---|
| Column 1, line 35, | "spacedn-apart" should be --spaced-apart-- |
| Column 2, line 15, | "substantiallyco planar" should be --substantially coplanar-- |
| Column 4, line 19, | "abovedescribed" should be --above-described-- |
| Column 5, line 2, | "diamondshaped" should be --diamond-shaped-- |

Signed and Sealed this

Tenth Day of February, 1987

*Attest:*

DONALD J. QUIGG

*Attesting Officer*          *Commissioner of Patents and Trademarks*